United States Patent
Gram

[15] 3,662,565
[45] May 16, 1972

[54] FREEZING APPARATUS HAVING A ROTATABLE HORIZONTAL FREEZING STRUCTURE

[72] Inventor: Hans Gram, Vojens, Denmark
[73] Assignee: Brodrene Gram A/S, Vojens, Denmark
[22] Filed: Feb. 26, 1970
[21] Appl. No.: 14,589

[30] Foreign Application Priority Data

Feb. 27, 1969    Denmark..............................1099/69

[52] U.S. Cl................................................62/345, 62/381
[51] Int. Cl. .........................................................F25c 1/10
[58] Field of Search .................62/345, 381, 380; 165/90, 86

[56]    References Cited

UNITED STATES PATENTS

| | | | |
|---|---|---|---|
| 2,279,804 | 4/1942 | Walz | 62/381 X |
| 2,215,486 | 9/1940 | Stone | 62/381 |
| 3,535,889 | 10/1970 | Curti | 62/345 X |

*Primary Examiner*—William E. Wayner
*Attorney*—Watson, Cole, Grindle & Watson

[57]    ABSTRACT

A freezing apparatus comprises a multitude of horizontally disposed arms extending radially from a rotatable housing in which means are provided for circulating a freezing medium through each of said arms.

2 Claims, 4 Drawing Figures

PATENTED MAY 16 1972

INVENTOR

Hans Gram

BY Watson, Cole, Grindle & Watson
ATTORNEY

3,662,565

FREEZING APPARATUS HAVING A ROTATABLE HORIZONTAL FREEZING STRUCTURE

BACKGROUND OF THE INVENTION

This invention relates to a freezing apparatus having a rotatable horizontal freezing structure.

In the known apparatus of this kind, the freezing structure consists of an annular horizontal freezing table, in which freezing pockets may be provided for receiving the material to be frozen.

With the constant demand for increased capacity of such freezing apparatus, these have been constructed with freezing tables of ever increasing size. There is, however, a limit to the permissible size of the freezing table, because in large size tables very substantial mechanical stresses will occur. This is particularly detrimental where the freezing table is constructed with freezing pockets, because the connection of the latter with the surface of the table may be damaged. Besides the shipping of machines having such large tables involves considerable difficulty.

SUMMARY OF THE INVENTION

It is the object of the invention to devise a freezing apparatus of the kind referred to, in which the above mentioned limitations with respect to the size of the freezing structure have been avoided. According to the invention, the freezing structure is composed of hollow arms extending radially from a housing containing means for supplying a freezing medium to the arms. Owing to the subdivision of the freezing structure into hollow arms, these will be less subject to thermal stresses, because they can freely expand and contract in the radial direction and also in the circumferential direction so that the arms may be made considerably longer than the radial width of the freezing tables of the prior art. Besides, the apparatus can be shipped with the arms detached so that the apparatus can be packed in a more compact form. Upon arrival to the place of erection the arms may then be mounted on the housing either permanently or, preferably, detachably, so that the arms may be replaced individually in the case of leakage. If the arms are detachably mounted, they may according to an embodiment of the invention be sealed relative to the interior of the housing by means of labyrinth glands so that it becomes possible to clean the arms by simple water jet washing.

In the above mentioned known freezing apparatus, the housing is intermittently rotated, which is advantageous in the case where the table is constructed with freezing pockets, because the pockets may then be filled and emptied by means of stationary filling and emptying devices in the periods of rest of the table. This technique can also be applied to the freezing apparatus of the invention, in which case the means for supplying freezing medium to the arms can be stationary and can be confined to part of the circumferential extent of the housing, means for supplying a thawing medium to the arms being provided over the remainder of the circumferential extent of the housing.

Where the freezing apparatus is intended for the freezing of portions of material, the arms may be provided in their upper faces with recesses to receive the material to be frozen. Other modifications are also possible within the scope of the invention. Thus as an example the apparatus may be constructed as a plate freezer, in which case the arms will have an outwardly increasing width and will be arranged closely side by side so as to form a substantially continuous surface, which may be used in the same manner as a plate freezer, e.g. for the freezing of individual pieces of fish.

The invention also provides favorable conditions for accurate control of the flow of the freezing medium through the arms. Thus, each arm may be subdivided by means of a partition into an upper and a lower compartment which communicate with each other at the outer end of the arm. In this manner there will be a controlled supply of freezing medium to the arms and a controlled removal of freezing medium therefrom. Especially where the arms are constructed with upwardly open pockets, this subdivision of the arms is of importance, because the fresh supply of freezing medium at the lowest temperature may be circulated past the upper portions of the pockets where the requirement of refrigeration is highest, whereafter the same freezing medium may flow past the bottoms of the pockets where freezing occurs more readily.

DESCRIPTION OF THE PREFERRED EMBODIMENTS

Figure 1:
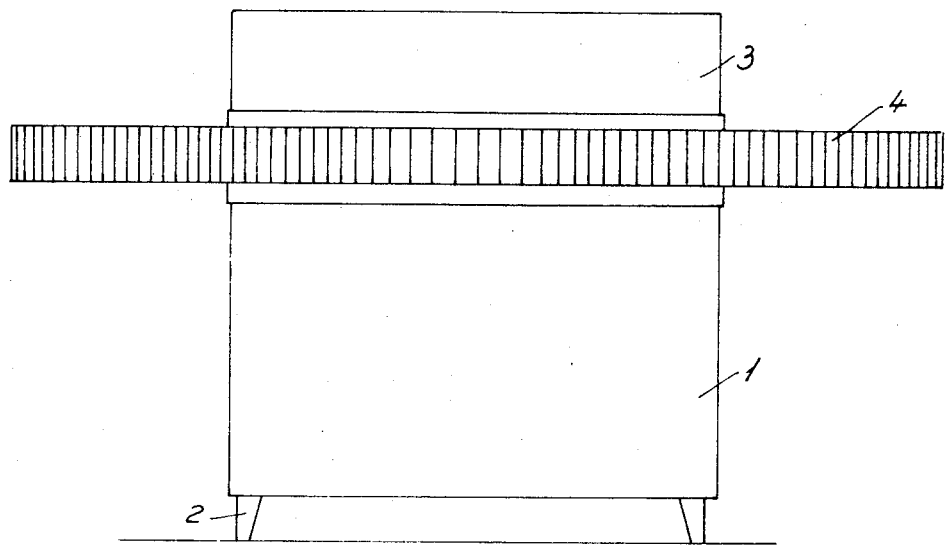
FIG. 1 shows diagrammatically a side view of a freezing apparatus according to one embodiment of the invention.
Figure 2:
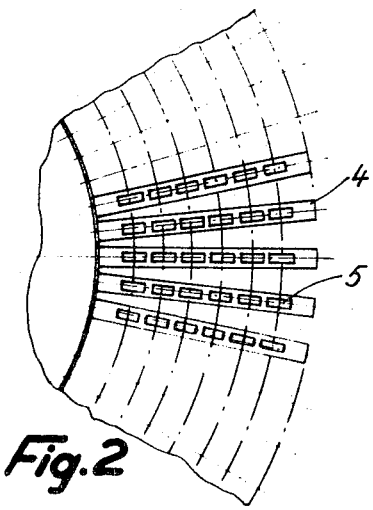
FIG. 2 is a top sectional view of the apparatus of FIG. 1.

In the drawing, 1 is a substantially cylindrical housing of a freezing apparatus constructed with legs 2. The upper part 3 of the housing is rotatably mounted relative to the lower part of same and carries a multitude of radially extending hollow arms 4. In the embodiments illustrated in the drawings, these arms have a substantially constant width along their radial length, such as is apparent from FIG. 2, and are constructed in their upper faces with recesses 5 for receiving the material to be frozen e.g. ice cream, vegetables or other material to be frozen in portions. However, if desired, the arms 4 may have outwardly increasing widths and plane upper surfaces and may be arranged closely side by side so as to combine to form a substantially continuous annular surface, which may be used in the same manner as a plate freezer, the material to be frozen being simply placed on the surface. In both cases the arms are free to expand and contract in their longitudinal direction and the circumferential stresses that have been found detrimental in large one-piece annular freezing tables are avoided.

Figure 3:
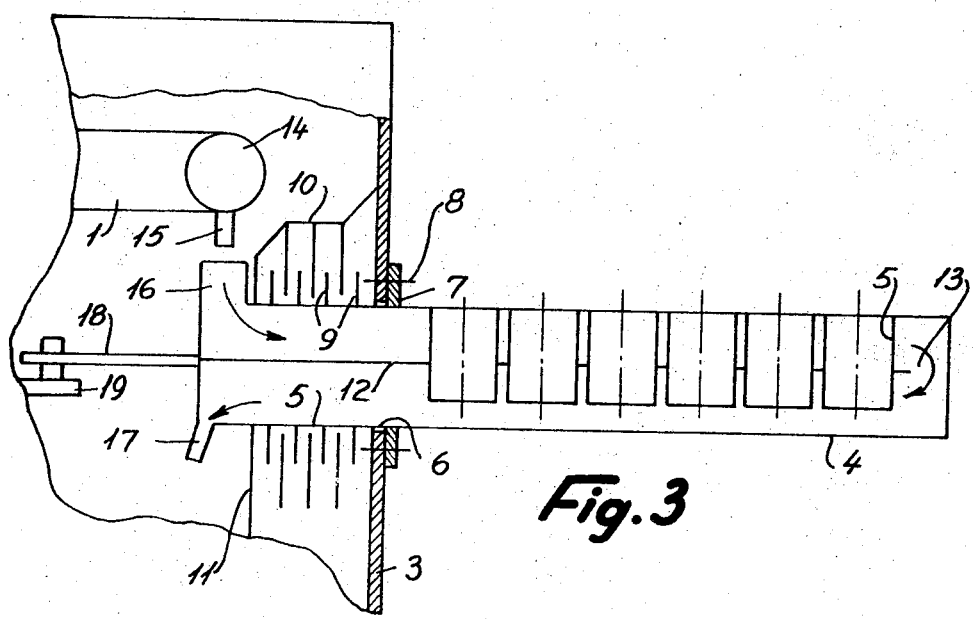
FIG. 3 is a fractional radial section through the apparatus of FIGS. 1 and 2.

In the embodiment of FIG. 3, the inner ends of the arms 4 extend through openings 6 of the upper housing part 3 into the interior thereof and are detachably connected therewith by means of a flange 7 of the arm, which is attached to the outer wall of the housing by screw means indicated at 8. The end of the arm present in the interior of the housing is constructed with outwardly extending baffle plates 9, which together with a system of baffle plates 10 form a labyrinth gland. The system of baffle plates 10 is terminated with an inner vertical screen plate 11, which extends to the bottom of the housing. Because of this labyrinth gland arrangement the arms may be cleaned by water jet washing, assuring that washing water or cleaning preparation, that may penetrate along the inner ends of the arms, is caught by the labyrinth gland arrangement and directed into the space between the inner screen plate 11 and the wall of the housing from which this leaking liquid may be drained off.

In the embodiment shown in FIG. 3, each arm 4 is subdivided by means of a horizontal partition 12, through which the freezing pockets 5 extend. The partition terminates at a distance from the outer end of the arm, so as to form a gap 13 forming a communication between the upper and lower compartments of the arm. Freezing medium is supplied by means of a stationary supply manifold 14, which is fed with freezing medium in a manner not shown, and at the bottom of which a plurality of spouts 15 are provided, the mutual distance of which corresponds substantially to the mutual distance of the inner ends of the arms. Each arm is constructed at its inner end with an upwardly extending filling tube 16, through which the freezing medium flows into the arm and upon flowing out and back along the arm leaves the same through an outlet tube 17 opening inside the inner screen plate 11 of the labyrinth gland. To the inner end of each arm there is connected a holding member 18 which is connected with a support 19 so that the inner end of the arm is held in a readily detachable manner. This support in combination with the support at the flange 18 prevents any tilting movement of the arm.

In the embodiment of FIG. 4, the arm 4 is again provided with the flange 7, which is attached to the wall 3 of the housing by screw means 8. The inner end of each arm is provided with two tubular extensions, viz. an inlet tube 16 and an outlet tube 17, the inlet tube being provided at the top and the outlet tube at the bottom. Inside the inlet tube 16 of the arms a stationary distributing passage 21 is provided, which receives freezing medium through a pipe 22. The outer edges of passage 21 slidably engage grooves provided along the inner surface of part 3 of the housing. Upon flowing through the arms the freezing medium flows into the space between the wall 3 of the housing and a cylindrical partition 23.

In the embodiment of FIG. 3, the manifold 14 extends along part of the circumferential extent of the housing only and thus supplies freezing medium to part of the arms 4 only. In the remaining angular section means, not shown, similar to the means 14, 15 are provided for supplying a thawing medium to the arms in position thereunder for the purpose of loosening the frozen material from the walls of the pockets 5.

Figure 4:
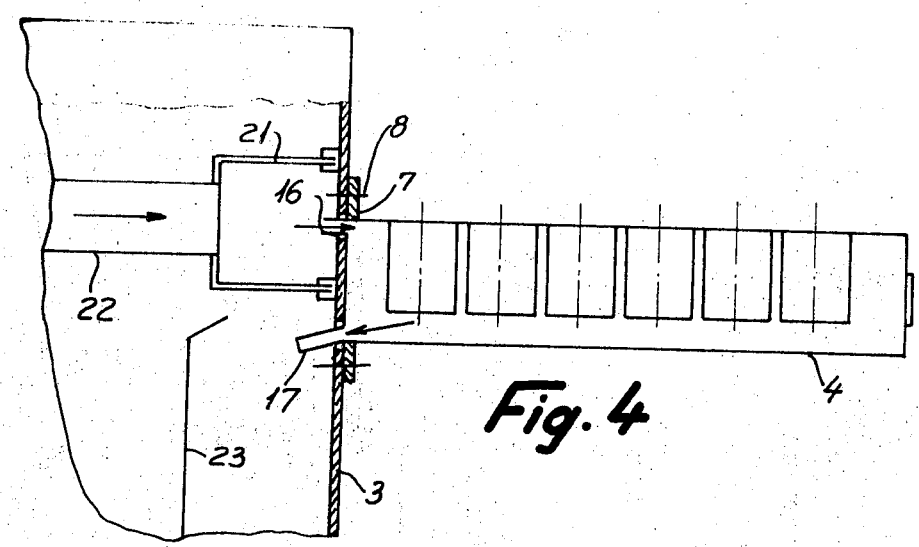
FIG. 4 is a similar section as FIG. 3, but illustrating a modified embodiment.

In the embodiment of FIG. 4, the supply pipe 22 is connected with a distributor not shown, which along a large angular section of the circumference supplies freezing medium to the pipe 22 for circulation through the arms, and along a smaller angular section of the circumference supplies a thawing medium to a pipe (not shown on the drawing) and a distributing passage (not illustrated) constructed in the same manner as pipe 22 and passage 21. It will be understood that both in the embodiment of FIG. 3 and in that of FIG. 4 radial partitions are provided in the housing for subdividing this so that the used thawing medium is collected separately from the freezing medium that has been circulated through the arms.

In both cases, the housing part 3 is intermittently rotated so that stationary filling and emptying devices may be used for filling and emptying the pockets 5.

I claim:
1. A freezing apparatus, comprising;
a housing divided into two compartments, one of said compartments is rotatable intermittently about a vertical axis with respect to said other compartment,
radial arms mounted to said rotatable compartment so that the upper surfaces thereof extend outwardly from said rotatable compartment in a common horizontal plane, said arms each including inlet and outlet means at the inner portions thereof for the circulation of a freezing medium through said arms,
means fixedly mounted to part of the circumferential extent of said housing for supplying a freezing medium to said inlet means,
and means for supplying a thawing medium to said inlet means fixedly mounted over the remainder of the circumferential extent of said housing.

2. A freezing apparatus, comprising;
a housing divided into two compartments, one of said compartments is rotatable about a vertical axis with respect to said other compartment,
radial arms detachably mounted to said rotatable compartment so that the upper surfaces thereof extend outwardly from said rotatable compartment in a common horizontal plane, said arms each including inlet and outlet means at the inner portions thereof for the circulation of a freezing medium through said arms, said arms are sealed relative to the interior of said compartment by means of labyrinth glands, and
means for supplying a freezing medium to said inlet means.

* * * * *